United States Patent [19]

Ikegami et al.

[11] Patent Number: 5,740,160
[45] Date of Patent: Apr. 14, 1998

[54] SETTING NETWORK IDENTIFIER IN WIRELESS LOCAL AREA NETWORK

[75] Inventors: Yoshikazu Ikegami; Kenichi Ariga, both of Tokyo, Japan

[73] Assignee: NEC Corporation, Japan

[21] Appl. No.: 610,988

[22] Filed: Mar. 4, 1996

[30] Foreign Application Priority Data

Mar. 6, 1995 [JP] Japan ................................ 7-045611
Mar. 6, 1995 [JP] Japan ................................ 7-045612

[51] Int. Cl.$^6$ .............................. H04L 12/28; H04Q 7/20
[52] U.S. Cl. ........................ 370/255; 370/338; 370/475
[58] Field of Search .................................. 370/252, 255, 370/257, 338, 346, 349, 457, 475; 340/825.07, 825.52

[56] References Cited

U.S. PATENT DOCUMENTS

| | | | |
|---|---|---|---|
| 5,276,680 | 1/1994 | Messenger | 370/311 |
| 5,387,905 | 2/1995 | Grube et al. | 370/329 |
| 5,519,706 | 5/1996 | Bantz et al. | 370/329 |
| 5,594,731 | 1/1997 | Reissner | 370/338 |

*Primary Examiner*—Melvin Marcelo
*Attorney, Agent, or Firm*—Ostrolenk, Faber, Gerb & Soffen, LLP

[57] ABSTRACT

When a wireless network is newly added to one or more existing wireless networks, each of which has a network identifier, it is desirable that a network identifier of the newly added network can be automatically set. The newly added network includes a plurality of terminals. First, network identifiers of the existing networks are received for a predetermined time period and stored in each of the plurality of terminals in a network identifier setting mode. Then, a network identifier of the newly added wireless network is automatically determined based on the stored network identifiers of the existing wireless networks. The determined network identifier is set in each of the plurality of terminals and the terminal mode is switched from the network identifier setting mode to a normal mode in each of the plurality of terminals.

12 Claims, 7 Drawing Sheets

Fig. 4

|  | CONTENT OF MEMORY TABLE (BEFORE STEP S4) | CONTENT OF MEMORY TABLE (AFTER STEP S9) |
|---|---|---|
| D1 | ID:01 | ID:03 |
|  |  | ID:04 |
|  |  |  |
| D2 | ID:02 | ID:02 |
|  |  | ID:04 |
|  |  |  |
| D3 | ID:02 | ID:02 |
|  | ID:03 | ID:03 |
|  |  |  |

SETTING NETWORK IDENTIFIER IN WIRELESS LOCAL AREA NETWORK

BACKGROUND OF THE INVENTION

1. Field of the Invention

The present invention relates to a wireless local area network (LAN), and more particularly, to acquisition of a network identifier (ID) of a wireless sub-network which is newly provided in addition to existing wireless sub-networks each having a unique network identifier.

2. Description of Related Art

Conventionally, even in a case where there is already a LAN composed of a plurality of wire sub-networks, a new wire sub-network can be locally constructed without influencing to the existing sub-networks. The new wire sub-network can be connected to ones of the existing sub-networks, and at that time influence to the existing sub-networks can be minimized by using a bridge device or a router device. This will be described taking a network structure shown in FIG. 1 as an example. In FIG. 1, a sub-network A is in an operation state and a sub-network B is newly added. The sub-network B is connected to the network A via abridge device in order to allow the networks A and B to access to each other but to prevent one of the networks A and B from transmitting any packet to the other in the internal data transfer. For instance, in a case of data transfer between a terminal a1 and a terminal a2 in the sub-network A, any data packet is not transmitted to the network B because of the bridge device. Similarly, in a case of data transfer between a terminal b1 and a terminal b2 in the sub-network B, any data packet is not transmitted to the network A.

Recently, attention is paid on a wireless LAN because it does not require to distribute wires and a layout of installation locations can be freely changed. However, in a case of construction of a new wireless sub-network, since electromagnetic wave is used as a transmission medium, the new sub-network cannot be physically isolated from existing sub-networks. Therefore, in a case where one wireless network is divided into a plurality of sub-networks, it is necessary to allocate a network identifier (ID) to each of the divided sub-networks so that each data packet can be identified. On the other hand, in a case where a new wireless network is constructed, it is necessary to acquire a network identifier. In this case, however, an installation engineer of the new network has to investigate network identifiers which are not used in the other existing networks and to set one of the network identifiers.

SUMMARY OF THE INVENTION

The present invention has, as an object, to provide a method and system for automatically setting a network identifier when a wireless network is newly added to existing wireless networks.

In order to achieve an aspect of the present invention, a method of automatically setting a network identifier of a wireless network which is newly added to one or more existing wireless networks, each of which has a network identifier, the newly added network including a plurality of terminals, includes the steps of:

receiving and storing network identifiers of the existing networks for a predetermined time period in each of the plurality of terminals in a network identifier setting mode;

automatically determining a network identifier of the newly added wireless network based on the stored network identifiers of the existing wireless networks;

setting the determined network identifier in each of the plurality of terminals; and switching a terminal mode from the network identifier setting mode to a normal mode in each of the plurality of terminals.

The network identifier may be determined by each of the plurality of terminals based on the stored network identifiers of the existing wireless networks. In a case of determination by each of the plurality of terminals, the step of automatically determining a network identifier includes transmitting a temporal network identifier associated with a specific one of the stored network identifiers of the existing wireless networks from each of the plurality of terminals to the other terminals, receiving, in each of the plurality of terminals, the temporal network identifiers from the other terminals, and automatically determining the network identifier of the newly added wireless network in each of the plurality of terminals based on the received temporal network identifiers and the transmitted temporal network identifier.

Alternatively, the network identifier may be determined by a parent terminal based on the stored network identifiers of the existing wireless networks. In a case of determination by the parent terminal, the step of automatically determining a network identifier includes transmitting the stored network identifiers of the existing wireless networks from each of the plurality of terminals other than the parent terminal to the parent terminal, receiving the network identifiers of the existing wireless networks by the parent terminal, automatically determining the network identifier of the newly added wireless network in the parent terminal based on the received network identifiers and the stored network identifiers, and transmitting the determined network identifier to the plurality of terminals other than the parent terminals. The parent terminal is determined as one of the plurality terminals which is first turned on, by transmitting from each of the plurality of terminals to the other terminals a parent notice packet indicating that the each terminal becomes the parent terminal, inhibiting the parent notice packet from being transmitted and responding an acknowledge to the parent notice packet transmitting terminal in each of the plurality of terminals, when the parent notice packet is received, and instructing execution of the receiving and storing step from the parent terminal to the other terminals when the acknowledges are received from all the other terminals.

In order to achieve another aspect of the present invention, a network identifier setting system in each of a plurality of terminals of a wireless network which is newly added to one or more existing wireless networks, each of which has a network identifier, includes a memory table for storing data, a receiving section for receiving a packet, a transmitting section for transmitting a packet, a detecting section for detecting a network identifier from received packet and for storing the detected network identifier in the memory table in a network identifier setting mode, a control section for controlling the receiving section to receive network identifiers of the existing networks for a predetermined time period in the network identifier setting mode, for automatically determining a network identifier of the newly added wireless network based on the network identifiers of the existing wireless networks stored in the memory table, for setting the determined network identifier, and for switching a terminal mode from the network identifier setting mode to a normal mode.

In order to still another aspect of the present invention, a network identifier setting system in each of a plurality of terminals of a wireless network which is newly added to one or more existing wireless networks, each of which has a network identifier, includes a memory table for storing data, a receiving section for receiving a packet, a transmitting section for transmitting a packet, a detecting section for detecting a network identifier from received packet and for storing the detected network identifier in the memory table in a network identifier setting mode, a control section for controlling the receiving section to receive network identifiers of the existing networks for a predetermined time period in the network identifier setting mode, for transmitting the network identifiers to a parent terminal when the terminal is not the parent terminal, for automatically determining a network identifier of the newly added wireless network based on the network identifiers of the existing wireless networks stored in the memory table and the received network identifiers of the existing wireless networks from other terminals of the newly added network, when the terminal is the parent terminal, for setting the determined network identifier in all the terminals of the newly added network, and for switching a terminal mode from the network identifier setting mode to a normal mode.

BRIEF DESCRIPTION OF THE DRAWINGS

FIG. 4 is a diagram illustrating the change of contents of memory tables in the terminals D1, D2 and D3 belonging to the newly added sub-network in the first embodiment;

DESCRIPTION OF THE PREFERRED EMBODIMENTS

A wireless local area network (LAN) according to the present invention will be described below with reference to the accompanying drawings.

Figure 1:
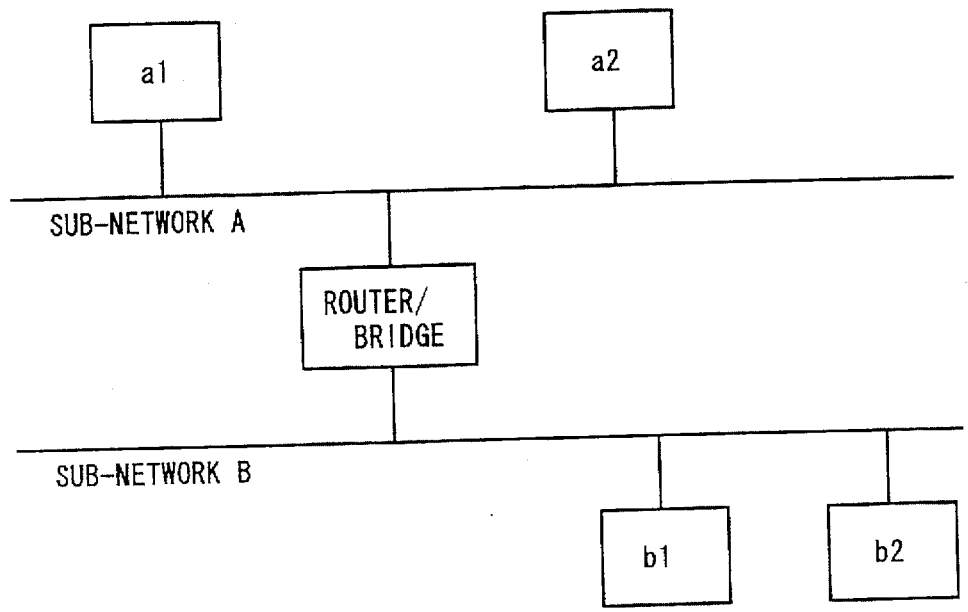
FIG. 1 is a block diagram illustrating of the state when two wire sub-networks are connected.

FIG. 1 is a block diagram of a terminal in a wireless LAN according to the first embodiment of the present invention. The terminal includes a CPU 21 containing a timer 30, for controlling the operation of the whole terminal, a wireless modem 25 for performing modulation/demodulation, and a LAN controller 24 connected to the wireless modem 25 and the CPU 21 via a system bus 28, for controlling transmission and reception of data packets. A ROM 22 connected the system bus 28 stores a program executed by the CPU 21 and a RAM 23 connected to the system bus 28 functions as a buffer for transmission/reception data packets and as a memory table in acquisition of a network identifier. A network identifier detecting circuit 26 connected to the wireless modem 25 and the system bus 28 detects a network identifier from the reception data packet to transfer to the memory table in the RAM 23. An I/O 27 connected to the system bus 28 interfaces with external terminals.

When a data packet is received by the wireless modem 25, the packet is transferred to the LAN controller 24 for subsequent processing in a normal mode. The operation in the normal mode is well known and therefore the description is omitted. In a network identifier setting mode, the received data packet is transferred not to the LAN controller 24 but to the network identifier detecting circuit 26. After extracting the network identifier, the detecting circuit 26 transfers the extracted network identifier to the RAM 23 such that the network identifier is written in the memory table.

Figure 3:
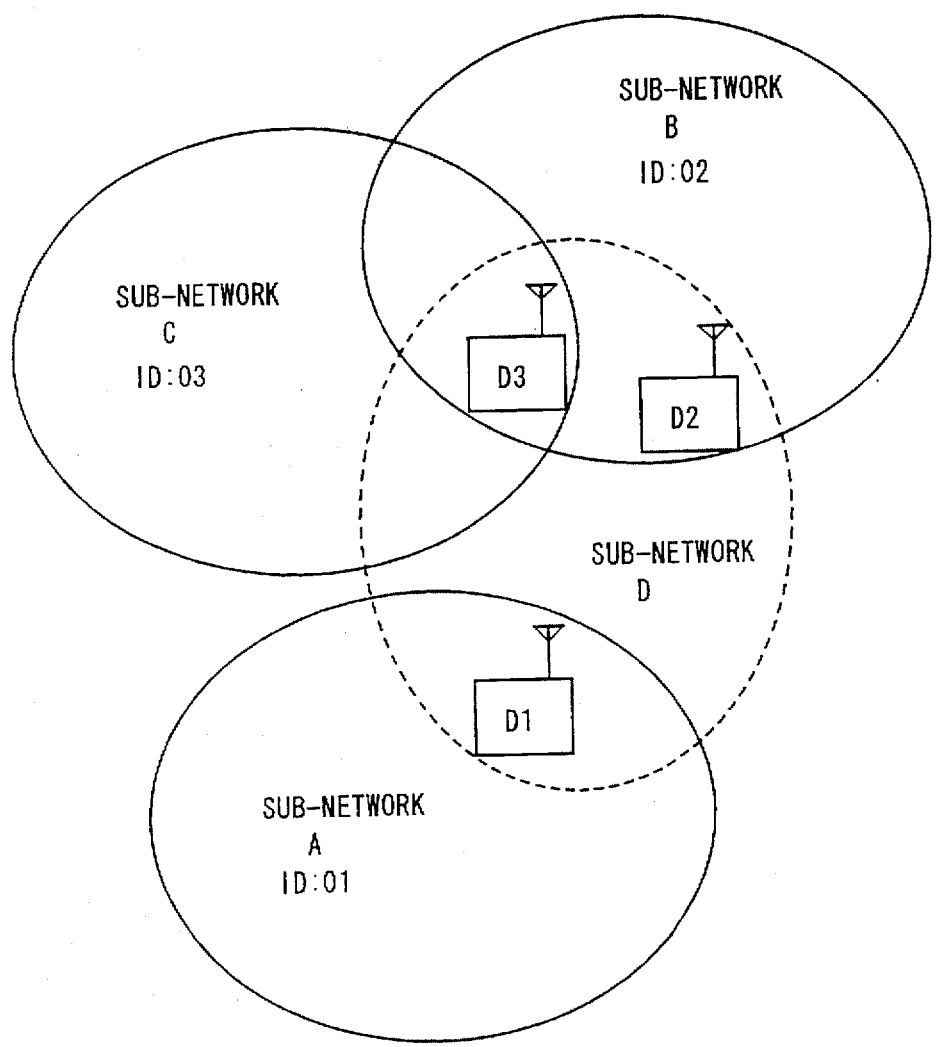
FIG. 3 is a diagram illustrating a relation of the newly added sub-network and the existing sub-networks in the first embodiment.
Figure 5:
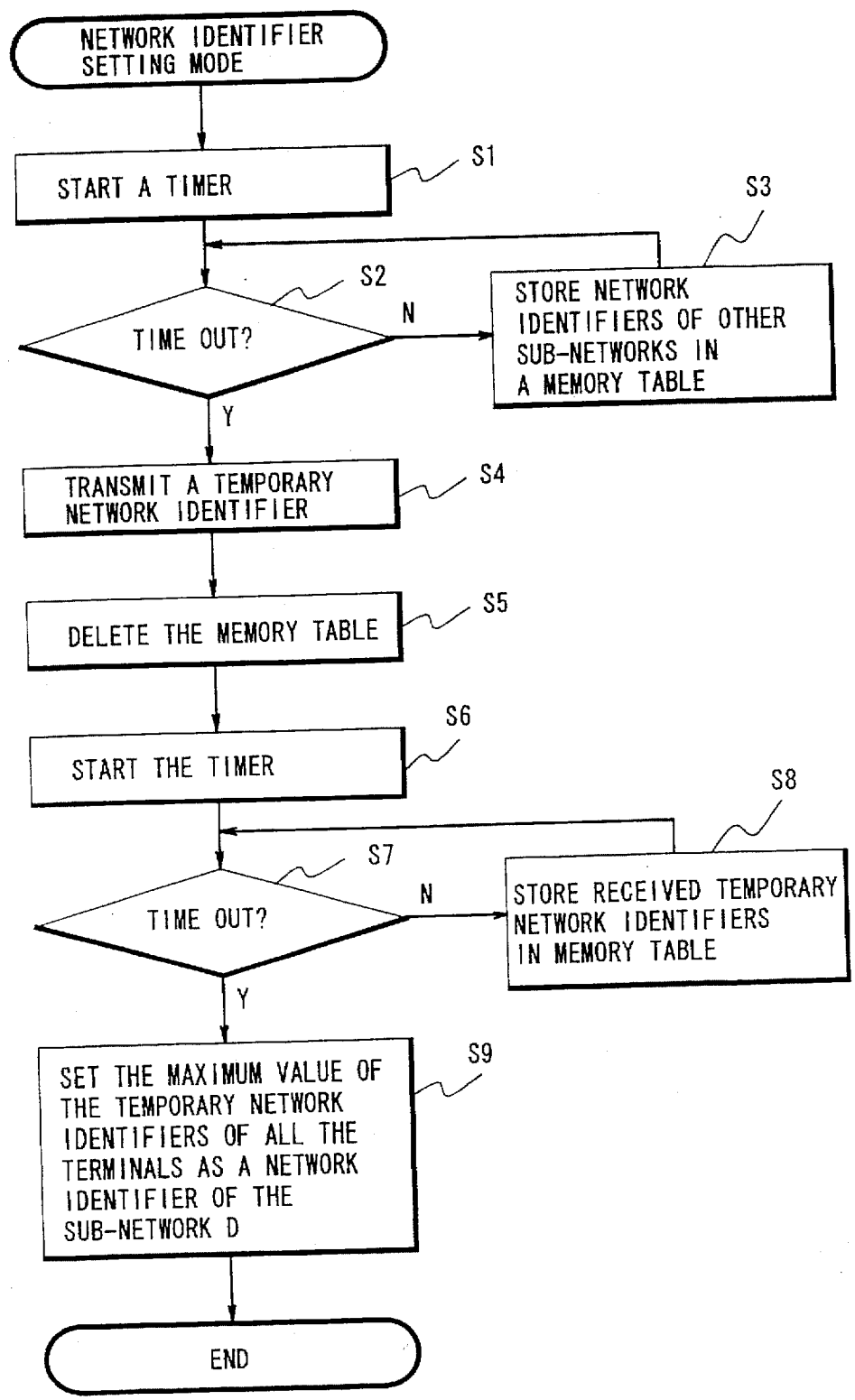
FIG. 5 is a flow chart illustrating the operation of determining a network identifier in the newly added sub-network in the first embodiment.

FIG. 5 is a flow chart illustrating the operation of a network identifier setting system according to the first embodiment. Referring to FIG. 5, the operation will be described. FIG. 3 is a diagram showing a relation of existing sub-networks A, B and C and a newly installed sub-network D. The existing sub-networks A, B and C have identifiers (ID) 01, 02 and 03, respectively. In FIG. 3, it is assumed that terminals belonging to the sub-networks A, B and C does not move between the sub-networks. The sub-network D includes three terminals D1, D2 and D3.

First, all the terminals D1, D2 and D3 belonging to the sub-network D are set in the network identifier setting mode. As a result, the CPU 21 disables the LAN controller 24 and enables the network identifier detecting circuit 26 in each of the terminals. At a step S1, The CPU 21 in each terminal sets a value to a timer 30 contained therein and initiates the timer 30. The value set in the timer 30 is a time from now to when other networks are all in the operation state, that is, packets each including network identifier are transmitted in all the sub-networks A, B and C. Therefore, data packets received from other existing sub-networks A, B and C are transferred to the network identifier detecting circuit 26 via the wireless modem 25. The detecting circuit 26 detects the network identifier from each from the transferred data packets and writes it in the memory table in the RAM 23. The content of the memory table is always searched and only a new network identifier is written in the memory table. This operation continues at a step S3 until the timer 30 times out. After the timer 30 goes to a time out state at a step S2, each terminal searches the memory table of the RAM 23 for a maximum value of the network identifiers. As described above, the network identifiers of the sub-networks A, B and C are numerical values. Therefore, it is possible to determine the maximum value. In an example shown in FIG. 4, the terminals D1, D2 and D3 have 01, 02 and 03 as a maximum value, respectively. After the timer 30 goes to the time out state in all the terminals belonging to the network D, the CPU 21 in each terminal controls the LAN controller 24 to transmit to other terminals belonging to the sub-network D via the modem 25 using a dedicated frame, a temporary network identifier obtained by adding "1" to the searched maximum value at a step S4. Then, the CPU 21 deletes the content of the memory table at a step S5 and then writes the transmitted temporary network identifier in the memory table of the RAM 23. Next, at a step S6, the CPU 21 re-initiates the timer 30. Until the timer 30 times out, each terminal receives the dedicated frames from the other terminals belonging to the sub-network D. Since the LAN controller 24 is disabled again, the dedicated frames are transferred to the network identifier detecting circuit 26. The detecting circuit 26 extracts the temporary network identifiers from the dedicated frames to store in the memory table at a step S8. The operation continues until the timer 30 times out. After the timer times out at a step S7, the terminal searches a maximum value from among the temporary network identifiers received from the other terminals belonging to the sub-network D and the temporary network identifier transmitted from the terminal. In the example shown in FIG. 4, the maximum value is 04. Each of the terminals sets the maximum value as the network identifier of the sub-network D at a step S9. When the network identifier is determined, the terminal mode is switched from the network identifier setting mode to the normal mode after the network identifier is automatically set. When the setting operation is completed in the three terminals D1, D2 and D3, the sub-network D is completely constructed.

Figure 2:
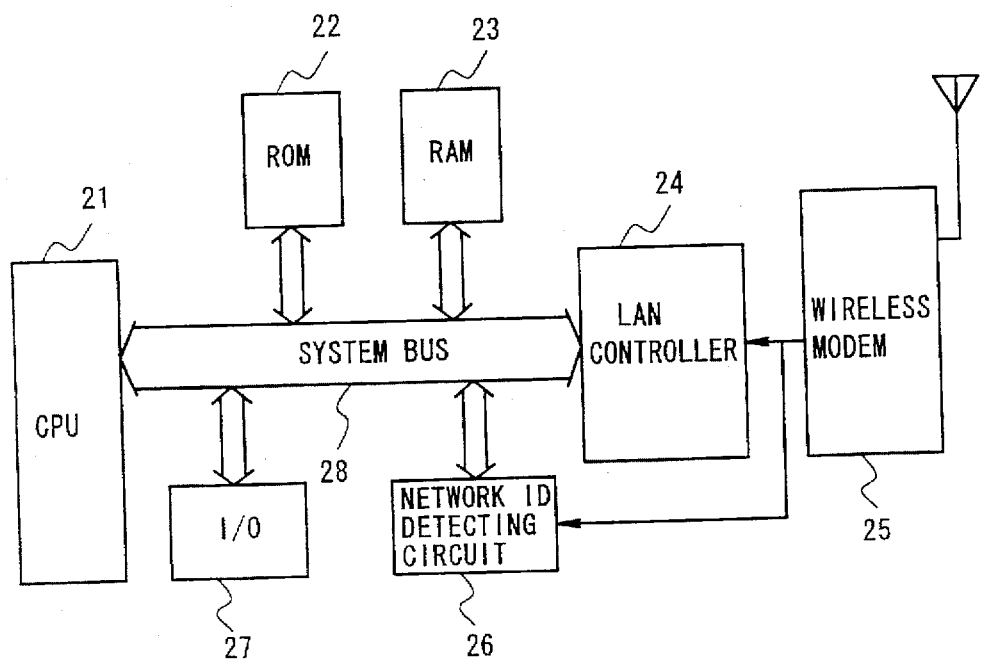
FIG. 2 is a block diagram illustrating the structure of each of terminals belonging to the wireless sub-network which is added to existing wireless sub-networks, according to a first embodiment of the present invention.

Next, the network identifier setting system in the LAN according to the second embodiment of the present invention will be described below. The structure of the network identifier setting system is the same as in the first embodiment shown in FIG. 2 and only the operation is different from that in the first embodiment. Therefore, the description of the structure is omitted.

Figure 6:
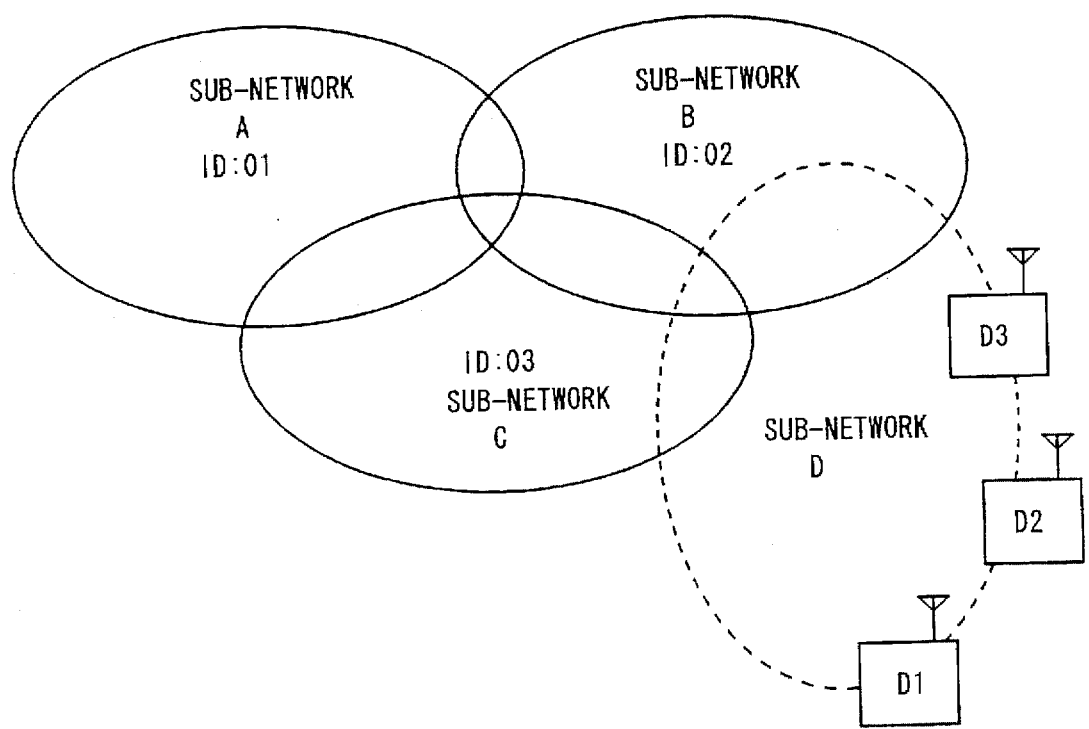
FIG. 6 is a diagram illustrating a relation of the newly added sub-network and the existing sub-networks in a second embodiment.

In the second embodiment, as shown in FIG. 6, it is assumed that a new sub-network D is constructed under the circumstance in which there are three wireless LAN sub-networks A, B and C. Also, it is assumed that terminals belonging to the sub-networks A, B and C does not move between the sub-networks. The sub-network D includes three terminals D1, D2 and D3.

Figure 7:
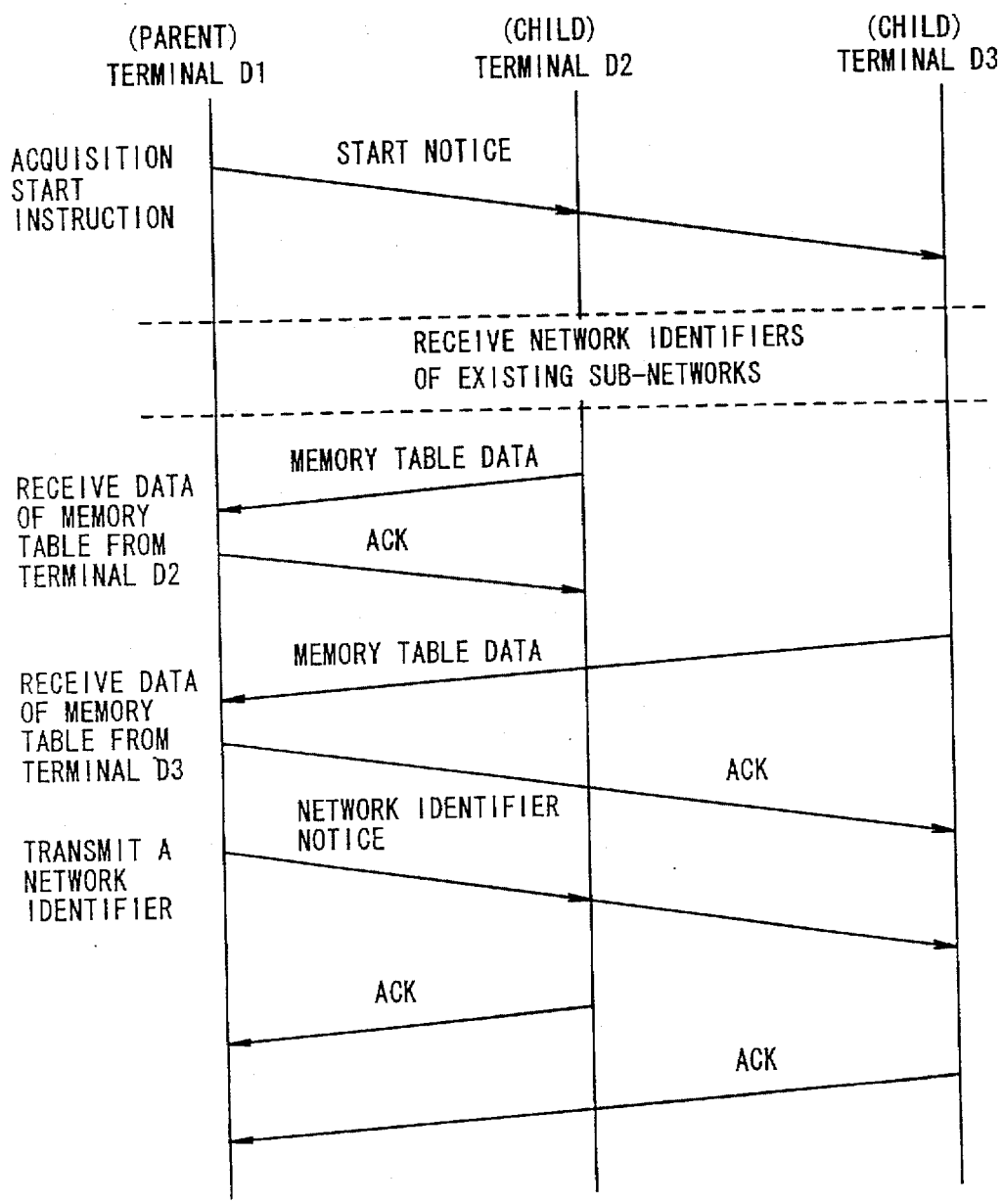
FIG. 7 is a sequence diagram when the network identifier of the newly added sub-network is determined by setting a temporal parent terminal.

FIG. 7 is a sequence diagram illustrating the network identifier setting operation in the second embodiment. Referring to FIG. 7, in the second embodiment, a network identifier dedicated for a network identifier setting mode is provided to inform the received network identifiers between the terminals. The dedicated network identifier is "0" in the second embodiment. A specific one is chosen from among the terminals belonging to the sub-network D and is referred to as "a parent terminal" hereinafter. The parent terminal receives the network identifiers of the existing sub-networks A, B and C and determines a network identifier of the sub-network D. The terminal D1 is determined as the parent terminal in advance in this example.

First, all the terminals belonging to the sub-network D are set in the network identifier setting mode, so that the network identifier detecting circuit 26 is made enabled and the LAN controller 24 is disabled. The parent terminal D1 transmits a packet to the other terminals D2 and D3 using the network identifier ID=0 to instruct to acquire the network identifiers of the other sub-networks A, B and C. When receiving the packet, each of the other terminals initiates the timer 30 and starts to store the network identifiers of the other sub-networks in the memory table of the RAM 23. The content of the memory table is always searched such that the network identifier already stored is not stored again, as in the first embodiment. The timer is set to a value from now to the time when the existing networks are all in the operation state so that packets are transmitted. When the timer times out, each of the other terminals transmits the content of the memory table and the identifier code of the terminal to the parent terminal D1 using the network identifier ID=0. The parent terminal D1 adds the network identifiers received from the other terminals D2 and D3 to the memory table of the terminal D1 in which network identifiers received by the terminal D1 are stored.

When the network identifiers are received from all the other terminals, the terminal D1 searches the memory table for an empty network identifier in an ascending order. In an example shown in FIG. 6, the network identifiers from "01" to "03" are in use. Therefore, the network identifier is determined to be "04". Thereafter, the determined network identifier is transmitted from the parent terminal D1 to all the other terminals D2 and D3 using the network identifier ID=0. The other terminals receive the determined network identifiers and set as the network identifier. After the network identifier is set, the terminal mode is switched from the network identifier setting mode to the normal mode in each of the terminal. Thereby, the construction of the network is completed.

Figure 8:
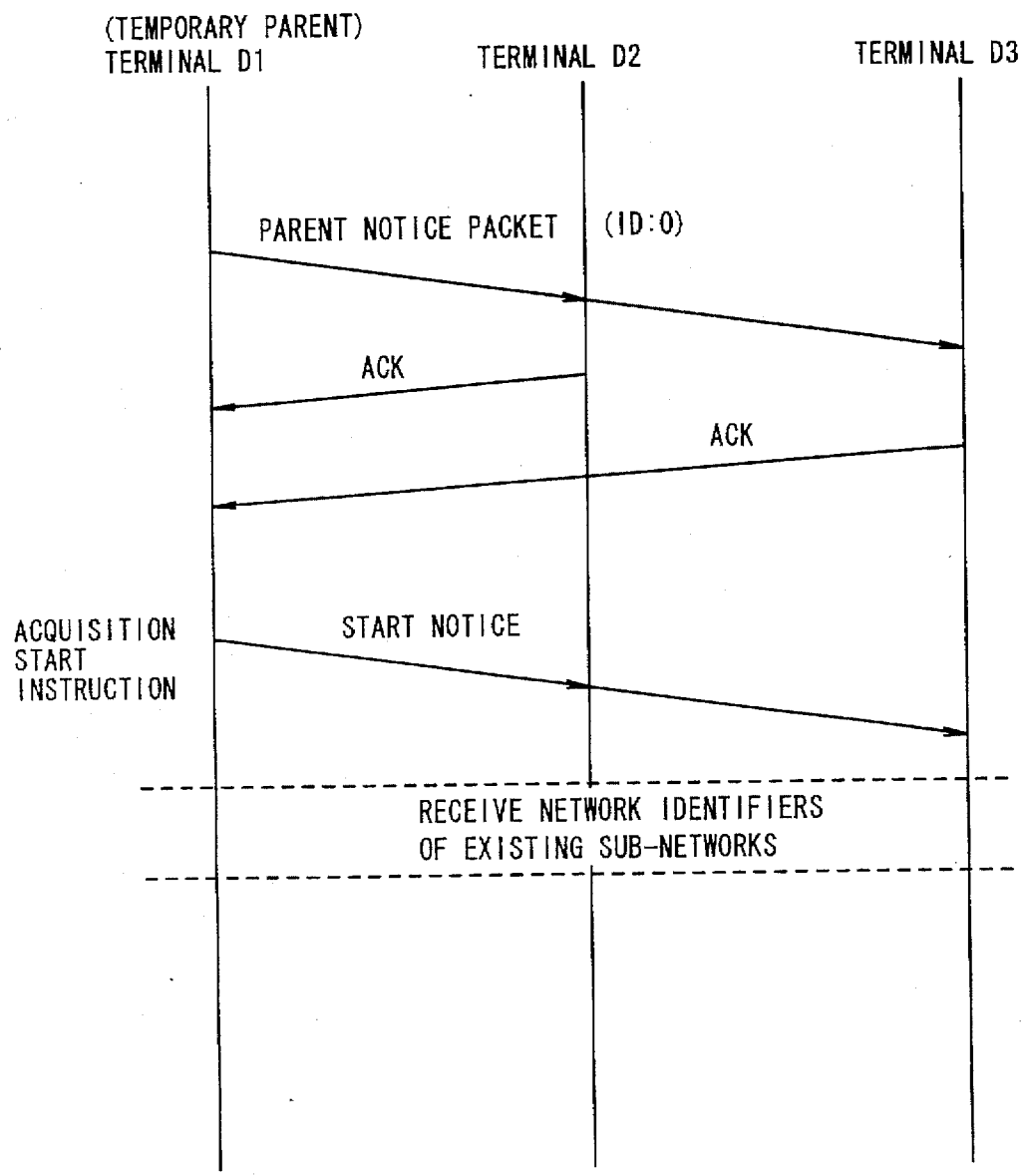
FIG. 8 is a sequence diagram when the temporal parent terminal is determined.

Next, a method of determining a parent terminal will be described with reference to FIG. 8. In the embodiment, a terminal, which is first turned on, from among terminals belonging to the sub-network D is determined as the parent terminal.

When being turned on, each of the terminals transmits a packet indicative of determination of the parent terminal to the other terminals using the network identifier ID=0. However, the terminal which has received the parent terminal determination packet cannot transmit the parent terminal determination packet. Thus, the parent terminal which is first turned on is determined as the parent terminal.

What is claimed is:

1. A method of automatically setting a network identifier of a wireless network which is newly added to one or more existing wireless networks, each of which has a network identifier, said newly added network including a plurality of terminals, comprising the steps of:

receiving and storing network identifiers of the existing networks for a predetermined time period in each of said plurality of terminals in a network identifier setting mode;

automatically determining a network identifier of said newly added wireless network based on the stored network identifiers of the existing wireless networks;

setting the determined network identifier in each of said plurality of terminals; and switching a terminal mode from the network identifier setting mode to a normal mode in each of said plurality of terminals.

2. A method according to claim 1, wherein said step of automatically determining a network identifier includes automatically determining said network identifier of said newly added wireless network in each of said plurality of terminals based on the stored network identifiers of the existing wireless networks.

3. A method according to claim 2, wherein said step of automatically determining a network identifier includes:

transmitting a temporal network identifier associated with a specific one of the stored network identifiers of the existing wireless networks from each of said plurality of terminals to the other terminals;

receiving, in each of said plurality of terminals, the temporal network identifiers from the other terminals; and automatically determining said network identifier of said newly added wireless network in each of said plurality of terminals based on the received temporal network identifiers and the transmitted temporal network identifier.

4. A method according to claim 1, wherein said step of automatically determining a network identifier includes automatically determining said network identifier of said newly added wireless network in a specific terminal of said plurality of terminals as a parent terminal based on the stored network identifiers of the existing wireless networks.

5. A method according to claim 4, wherein said step of automatically determining a network identifier includes:

transmitting the stored network identifiers of the existing wireless networks from each of said plurality of terminals other than said parent terminal to said parent terminal;

receiving the network identifiers of the existing wireless networks by said parent terminal;

automatically determining said network identifier of said newly added wireless network in said parent terminal based on the received network identifiers and the stored network identifiers; and transmitting the determined network identifier to said plurality of terminals other than said parent terminals.

6. A method according to claim 4, wherein said parent terminal is one of said plurality terminals which is first turned on.

7. A method according to claim 4, wherein said parent terminal is a predetermined one of said plurality terminals.

8. A method according to claim 6, further comprising the steps of:

each of said plurality of terminals transmitting to the other terminals a parent notice packet indicating that said each terminal becomes the parent terminal;

when the parent notice packet is received, inhibiting the parent notice packet from being transmitted and responding an acknowledge to the parent notice packet transmitting terminal in each of said plurality of terminals; and instructing execution of said receiving and storing step from the parent terminal to the other terminals when the acknowledges are received from all the other terminals.

9. A network identifier setting system in each of a plurality of terminals of a wireless network which is newly added to one or more existing wireless networks, each of which has a network identifier, said network identifier setting system comprising:

a memory table for storing data;

receiving means for receiving a packet;

transmitting means for transmitting a packet;

detecting means for detecting a network identifier from received packet and for storing the detected network identifier in said memory table in a network identifier setting mode;

control means for controlling said receiving means to receive network identifiers of the existing networks for a predetermined time period in the network identifier setting mode, for automatically determining a network identifier of said newly added wireless network based on the network identifiers of the existing wireless networks stored in said memory table, for setting the determined network identifier, and for switching a terminal mode from the network identifier setting mode to a normal mode.

10. A network identifier setting system according to claim 9, wherein said control means transmits a temporal network identifier associated with a specific one of the stored network identifiers of the existing wireless networks to other terminals of said newly added network, and for automatically determining, when the temporal network identifiers are received from the other terminals, said network identifier of said newly added wireless network based on the received temporal network identifiers and the transmitted temporal network identifier.

11. A network identifier setting system in each of a plurality of terminals of a wireless network which is newly added to one or more existing wireless networks, each of which has a network identifier, said network identifier setting system comprising:

a memory table for storing data;

receiving means for receiving a packet;

transmitting means for transmitting a packet;

detecting means for detecting a network identifier from received packet and for storing the detected network identifier in said memory table in a network identifier setting mode;

control means for controlling said receiving means to receive network identifiers of the existing networks for a predetermined time period in the network identifier setting mode, for transmitting the network identifiers to a parent terminal when said terminal is not the parent terminal, for automatically determining a network identifier of said newly added wireless network based on the network identifiers of the existing wireless networks stored in said memory table and the received network identifiers of the existing wireless networks from other terminals of said newly added network, when said terminal is the parent terminal, for setting the determined network identifier in all the terminals of said newly added network, and for switching a terminal mode from the network identifier setting mode to a normal mode.

12. A network identifier setting system according to claim 11, wherein said control means further includes means for transmitting to the other terminals a parent notice packet indicating that said terminal becomes the parent terminal, and for inhibiting the parent notice packet from being transmitted and responding an acknowledge to the parent notice packet transmitting terminal, when the parent notice packet is received.

* * * * *